United States Patent [19]
Peters et al.

[11] Patent Number: 5,003,391
[45] Date of Patent: Mar. 26, 1991

[54] CIRCUITRY FOR PROCESSING A SYNCHRONIZING SIGNAL

[75] Inventors: Matthias Peters, Halstenbek; Gerd Onken, Hamburg, both of Fed. Rep. of Germany

[73] Assignee: U.S. Philips Corporation, New York, N.Y.

[21] Appl. No.: 405,488

[22] Filed: Sep. 11, 1989

[30] Foreign Application Priority Data

Sep. 21, 1988 [DE] Fed. Rep. of Germany ....... 3832058

[51] Int. Cl.$^5$ .............................................. H04N 5/04
[52] U.S. Cl. ..................................... 358/148; 358/153
[58] Field of Search ............... 358/148, 158, 153, 154, 358/165, 17, 19

[56] References Cited
U.S. PATENT DOCUMENTS

3,504,115  3/1970  Suzuki et al. ........................ 358/153
4,228,464  10/1980  Duijkers ............................. 358/165

Primary Examiner—James J. Groody
Assistant Examiner—David E. Harvey
Attorney, Agent, or Firm—John Francis Moran

[57] ABSTRACT

Circuitry for processing, in a television signal, a first, low-frequency synchronizing signal on which a second, high-frequency synchronizing signal is superposed, for supplying standardized television signal capable of being processed by a customary television signal processing arrangement or display device, respectively by inhibiting a shift between the picture content of the signal representing the television signal and the synchronizing signal. The circuitry includes a first signal processing branch (1) having a low-pass filter (11) for separating low-frequency components and consequently the first synchronizing signal (Sy1) from the television signal, a synchronizing pulse detector (12) for detecting signal variations exceeding a cut-off level (SP) in the low-frequency components, and also a pulse generating stage (13) for producing a pulse when such a signal variation corresponding to a synchronizing pulse of the first synchronizing signal (Sy1) is detected, the pulse being of a duration shorter than the shortest second synchronizing signal (Sy2), a second signal processing branch (2) having a halfwave detector (21) for separating signal peaks exceeding maxima (MaSy1) of the first synchronizing signal (Sy1) from the television signal and for charging a signal store (23) in a first direction during a time interval corresponding to the period of the second synchronizing signal (Sy2), in which the signal peaks occur, and also a third signal processing branch (3) producing a constant reference level during a time interval wherein either a pulse is supplied in the first signal processing stage (1) or the signal store (23) is charged in the first direction, instead of the television signal produced in the remaining time.

5 Claims, 3 Drawing Sheets

CIRCUITRY FOR PROCESSING A SYNCHRONIZING SIGNAL

BACKGROUND OF THE INVENTION

The invention relates to a circuitry for processing, in a television signal, a first, low-frequency synchronizing signal on which a second, high-frequency synchronizing signal is superposed.

A customary baseband television signal contains a synchronizing signal for synchronizing the line or frame frequency in addition to the luminance and the chrominance signal. This synchronizing signal consists of individual or grouped, basically square-wave pulses which occur at a low repetition rate compared with the overall television signal. For certain applications a second, high-frequency synchronizing signal, which preferably consists of sections of a sinusoidal oscillation having a frequency equal to an integral multiple of the line frequency of the television signal is superposed on the pulses of this synchronizing signal. This second synchronizing signal which is alternatively denoted as "pilot burst" has a constant phase throughout the overall duration of the television signal. Beginning and end points of the sections of the sinusoidal oscillation are fixed within the duration of the pulse of the first synchronizing signal, the amplitude of the sinusoidal oscillations basically corresponds to the amplitude of the pulses of the first synchronizing signal, and the zero line of the sinusoidal oscillations is located at the maximum, that is to say at the amplitude value of the pulses of the first synchronizing signal.

When such a television signal is processed by means of receiver arrangements suitable for, for example, the PAL or the SECAM standard, a problem is that the second synchronizing signal is detected because of its high amplitude as an interference of the first synchronizing signal, or that instead of a single pulse of the first synchronizing signal a plurality of these pulses are erroneously detected. In these cases the processing of the television signal is disturbed.

The JP-Kokai No. 58-119287 discloses a circuit for generating a command signal for eliminating the "pilot burst", in which selectively a frequency component corresponding to a synchronization pulse peak level in a PAL-color television HF signal is included. To that end, using a selector switch, either the received HF signal or the HF signal from a preceding line of the television picture is selected and applied to a frequency demodulator as well as to a circuit arrangement for generating a control signal for the elimination of the "pilot burst". The intermediate frequency of a narrow band filter included in the circuit arrangement for generating the command signal corresponds to the frequency in correspondance with the synchronizing pulse peak level of the video signal obtained by frequency demodulation of the HF signal. On reception of a frequency corresponding to the synchronizing pulse peak level, a signal of a high amplitude is consequently obtained which is detected by a signal level detection circuit and generates therefrom a command signal for cancelling the "pilot burst". In a cancelling circuit the "pilot burst" in the synchronizing signal of the video signal is removed by the command signal.

SUMMARY OF THE INVENTION

An object of the present invention is to provide circuitry wherein the synchronizing signals of the television signal are processed such that a subsequent signal processing operation by conventional arrangements is therefore possible without any interference.

According to the invention, this object is achieved in circuitry comprising a first signal processing branch having a low-pass filter for separating low-frequency components and consequently the first synchronizing signal from the television signal, a synchronizing pulse detector for detecting signal variations exceeding a cut-off level in the low-frequency components, and also a pulse generating stage for producing a pulse when such a signal variation corresponding to the first synchronizing pulse is detected, the pulse being of a duration shorter than the shortest second synchronizing signal, a second signal processing branch having a half-wave detector for separating signal peaks exceeding maxima of the first synchronizing signal from the television signal and for charging a signal store in a first direction during a time interval corresponding to the periods of the second synchronnizing signal, in which the signal peaks occur, and also a third signal processing branch in which during a time interval in which either a pulse is supplied in the first signal processing stage or the signal store is charged in the first direction, a signal having a constant reference level is transmittable and the television signal in the remaining period of time.

Thus, in accordance with the invention the (high-frequency) synchronizing signal is replaced in the television signal by the signal having the constant reference level, which preferably corresponds to the amplitude value of the (low-frequency) synchronizing pulses. Basically, the criterion for replacing the synchronizing signal is already supplied by the first signal processing branch in which the cut-off frequency of the low-pass filter is chosen such that it suppresses the synchronizing signal. The additional second signal processing branch produces in addition a further time criterion for substituting the signal having the constant reference level for the original television signal, while this substitution is combined during a synchronizing pulse of the first synchronizing signal with the duration of the second synchronizing signal. Namely, because of the time delay of the low-pass filter a time delay of the signal variations of the synchronizing pulses exceeding the cut-off level detected by th synchronizing pulse detector occurs compared with the synchronizing pulse in the original television signal. This delay would cause in the processed television signal a shift in the time intervals of the trailing edges of the (processed) synchronizing signal relative to the picture content of the television signal. This would cause a shift of the overall picture on the picture display device on display of the processed television signal. This is particularly annoying in those cases in which television signals of different signal sources are to be displayed on the picture display device.

In contrast thereto, in the circuit arrangement of the invention, the trailing edge of the processed synchronizing signal is temporally combined with the end of the second synchronizing signal within the synchronizing pulse of the first synchronizing signal, so that a fixed temporal assignment to the trailing edge of the synchronizing pulse is achieved without the delay described in the foregoing. The television signal thus processed is therefore in all respects in accordance with the standards and can be further processed and conveyed without any risk of erroneously detected interferences by the customary television signal processing arrangements.

In a further illustrative embodiment, the signal store is also charged in the first direction during the duration of the pulses produced by the pulse generating stage. The signal store is then used for both evaluating the pulses from the first signal processing branch and for evaluating the second synchronizing signal contained in the second signal branch, so that advantageously the OR-combining operation, which determines the duration of the transmission of the signal having the constant reference level, can be effected in the charging of the signal store in the first direction. This simplifies the circuit configuration.

Advantageously, a permanent charging source charges the signal store continuously in a second direction opposite to the first direction. Because of this permanent charging source, the signal store permanently assumes a second charging state corresponding to the second direction outside the time intervals in which charging in the first direction is effected. Preferably, the permanent charging source produces a current which as regards its value is basically less than the currents produced by the halfwave detector or the pulse generating stage for charging the signal store. The latter currents then mask the constant permanent charging current at the occurrence of the synchronizing pulse.

BRIEF DESCRIPTION OF PREFERRED EMBODIMENT

Embodiments of the invention are shown in the accompanying drawings and will now be described in greater detail with reference thereto.

FIG. 1 is a block schematic circuit diagram of a first illustrative embodiment of the present invention, FIG. 2 demonstrates signal waveforms generated by the arrangement of FIG. 1, FIG. 3 is a detailed representation of a second illustrative embodiment.

DETAILED DESCRIPTION OF THE INVENTION

Figure 1:
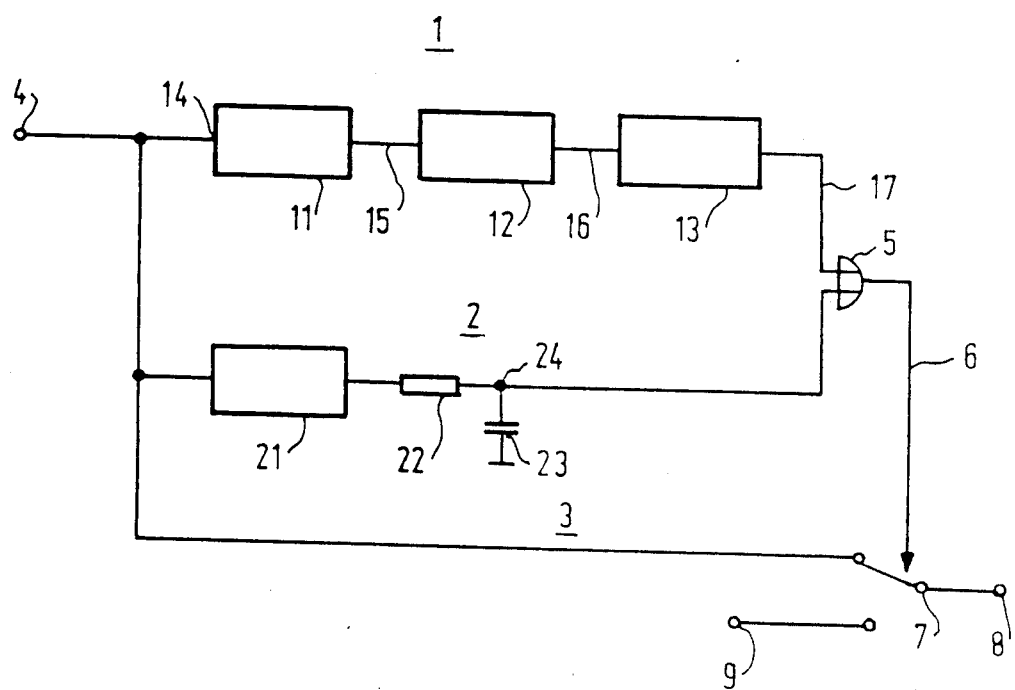
Figure 2:
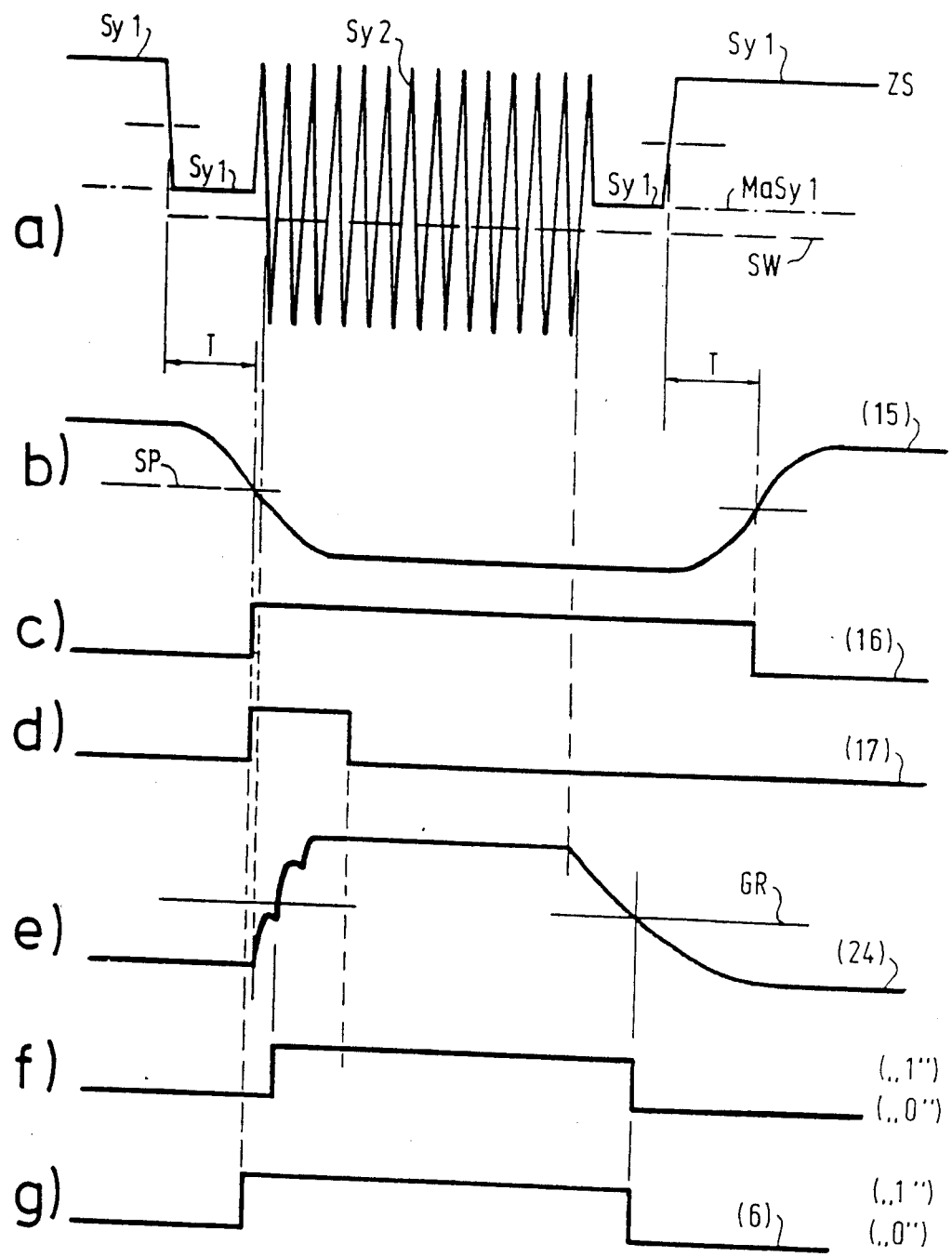

In FIG. 1 a first signal branch 1 comprises a low-pass filter 11, a synchronization pulse detector 12 as well as a pulse generating stage 13. From a television signal input applied to input 4, the signal which in addition to a luminance and a chrominance signal contains a first low-frequency synchronizing signal composed from individual synchronizing pulses for the line frequency and the picture frequency, respectively, is applied to the low-pass filter 11 via its input 14. Superposed on the synchronizing pulses of this first synchronizing signal is a second, high-frequency synchronizing signal which in a defined time interval within the individual synchronizing pulses of the first synchronizing signal has a fixed number of periods of a sinusoidal oscillation, whose frequency is an integral multiple of the repetition rate of the synchronizing pulse and which disappears during the remaining period of time. The amplitude of the second synchronizing signal basically corresponds to the amplitude of the first synchronizing signal. The synchronizing signal composed from the first and the second synchronizing signal is represented in FIG. 2 (a) and is denoted by ZS. In addition, in FIG. 2 (a) the sections of the waveform denoted by Sy1 represent the components of the first synchronizing signal in the region of a synchronizing pulse and the portions of the waveform denoted by Sy2 represent the superimposed oscillation cycles of the second synchronizing signal.

In the low-pass filter 11, high-frequency signal components are removed from the television signal and consequently also from the composite synchronizing signal ZS. The separated low-frequency signal components of the television signal are applied to the synchronizing pulse detector 12 via the conductor 15 from the low-pass filter 11. In the region of the synchronizing pulse of the first synchronizing signal Sy1, the signal on the conductor 15 assumes the shape denoted in FIG. 2 (b). Because of the transmission properties of the low-pass filter 11 not only the pulse edges are eliminated therein compared with the first synchronizing signal Sy1, but also the high-frequency oscillation of the second synchronizing signal Sy2 is suppressed. Because of the signal delay time produced by the low-pass filter 11, the pulse on the conductor 15 in accordance with FIG. 2 (b) occurs with a delay relative to the synchronizing pulse from the first synchronizing pulse Sy1 at the television signal input 4. As a measure for this delay, the time T is introduced in FIG. 2, which period of time occurs between the appearance of half the amplitude value in the variation of the pulse edge of the first synchronizing signal Sy1 on the one hand and the signal on the conductor 15 on the other hand. If such a pulse as shown in FIG. 2 (b) is directly utilized as the synchronizing pulse for the television signal, a shift of the picture content through the time T or through a time interval corresponding to this time T would occur on a picture display device. This situation would not be changed even when, as is shown in FIG. 2 (c), the pulse in accordance with FIG. 2 (b) were compared with a cut-off level SP—for example in a comparator—and the output signal of this comparator would be used as the synchronizing pulse. A square wave pulse as shown in FIG. 2 (c) would then indeed be obtained, but the delay by the time T would however still be present.

To eliminate this disadvantage, the output signal of the synchronizing pulse detector 12 which has, for example, a waveform versus time as shown in FIG. 2 (c), is applied to the pulse generating stage 13 via a conductor 16. Starting with the leading edge of the pulse on the conductor 16, that is to say when a synchronizing pulse is detected, this pulse generating stage generates a pulse whose variation is shown in FIG. 2 (d) and whose duration is shorter than the shortest occurring, second synchronizing signal, so that the pulse in accordance with FIG. 2 (d) has decayed again at any rate after the last oscillation cycle of the second synchronizing signal Sy2. This pulse is supplied via a conductor 17.

Basically it is conceivable that the duration of the pulse of FIG. 2 (d) on the conductor 17 is set such that it extends until the end of the synchronizing pulse of the first synchronizing signal Sy1. The components required therefor are however subjected to tolerances which render a setting of this duration with the required accuracy are complicated and difficult. Even if the duration were adjusted accurately, the end of the pulse shown in FIG. 2 (d) would not be exactly determinable as regards its position in time, as the beginning of this pulse, that is to say the ascending edge, is subjected at least to the tolerances determined by the low-pass filter 11.

In accordance with the invention, the circuit arrangement is therefore provided with a second signal branch 2 which includes a halfwave detector 21. From the television signal, this detector separates signal peaks which exceed the maxima of the first synchronizing signal. FIG. 2 (a) shows such a maximum level designated MaSy1. It forms the pulse bottom of the synchronizing pulses from the first synchronizing signal Sy1. In addition, a threshold value SW is shown in FIG. 2 (a) at a slight distance from the pulse bottom MaSy1. The halfwave detector 2 now separates all those signal peaks of the second synchronizing signal Sy2 that exceed this threshold value SW—towards the bottom in the representation of FIG. 2 (a), that is to say in the direction of still higher synchronizing pulse amplitudes. This choice of the individual level and values achieve that the halfwave detector does not respond to the first synchronizing signal Sy1 or the second synchronizing signal Sy2 only, but only to the combination of these two synchronizing signals in the composite synchronizing signal ZS. So if, for example, a "standardized" television signal is present at the television signal input 4, which does not contain the second synchronizing signal Sy2, the second signal branch 2 would not be energized.

The signal peaks of the second synchronizing signal Sy2 which are separated in accordance with the threshold value SW, charge a capacitor 23 which serves as a signal store in a first direction via a resistor 22, in the present case to a higher voltage at the junction point, or node, 24 between the resistor 22 and the capacitance 23. This charging action is effected in bursts by each signal peak until the end of the second synchronizing signal Sy2. After the period of the second synchronizing signal Sy2, the capacitor 23 discharges again to lower voltages at the junction point 24, that is to say a charge procedure is effected in a second direction until a final value of the voltage at the junction point 24.

The charging procedure described and the signal variation resulting therefrom for the voltage at the junction point 24 is illustrated in FIG. 2 (e). The charging current for the capacitor 23 and the pulse period of the pulses on the conductor 17 are so rated relative to each other, that the voltage at the junction point 24 has reached its final value of the charge in the first direction—starting from the final value of the charge action in the second direction—before the pulse on the conductor 17 has ended. This can be seen when the FIG. 2 (d) and 2 (e) are compared.

The signals or voltages on the conductor 17 or at the junction point 24, respectively, are combined by an OR-gate 5. To that end, the OR-gate 5 first effects an evaluation of the voltage at the junction point 24. This is effected in a known manner, for example by means of a threshold switch which is assigned to the corresponding input of the OR-gate 5 and valuates all the voltage values, seen from a cut-off value GR in the first direction of the charging action of the signal store in capacitor 23 as a logic signal "1" and all the other voltage values at the junction point 24 as a logic signal "0". The final state of charging of the signal store 23 in the second direction consequently corresponds to logic "0". The cut-off value GR is correspondingly plotted in FIG. 2 (e). FIG. 2 (f) then represents the valuation of the voltage variation at the junction point 24 in accordance with logic levels.

Finally, FIG. 2 (g) illustrates the logic signal at the output 6 of the OR-gate 5. It forms a pulse whose ascending edge is determined by the pulse of the conductor 17 and the descending edge thereof by the charging procedure of the signal store 23 and the cut-off value GR. It is therefore possible, particularly for the trailing edge of the pulse at the output 6, to respect narrow temporal tolerances, since the instant at which this edge occurs only depends on the end of the second synchronizing signal Sy2 and the elements determining the charging procedure of the signal store in the second direction. As this charging procedure is however of a short duration compared with the overall duration of the synchronizing pulse in the first synchronizing signal Sy1, tolerances in these components have only a minor effect on the overall state of the synchronizing pulse. Consequently, a pulse position having a high temporal accuracy is achieved with simple means. The exact temporal allocation of the trailing edge of the pulse at the output 6 and the trailing edge of the synchronizing pulse of the first synchronizing signal Sy1 as shown in FIG. 2 (a) can then be chosen by the rating of those components of the circuit arrangement that are appropriate for the charging procedure in the second direction.

FIG. 1 furthermore shows a third signal branch 3 which via a change-over switch 7 optionally connects a television signal output 8 to the television signal input 4 or to a terminal 9, at which an artificial synchronizing pulse level is present which at least substantially corresponds to the level of the first synchronizing signal Sy1 in the region of the pulse cycles MaSy1. The change-over switch 7 is actuated by the logic signal at the output 6 of the OR-gate 5 and then, when this signal corresponds to a logic "1", always connects the terminal 9 to the television signal output 8; in the remaining periods of time the television signal input 4 is directly switched to the television signal output 8 via the change-over switch 7. The composite synchronizing signal ZS is then replaced in the region of a synchronizing pulse by a constant-level signal.

Figure 3:
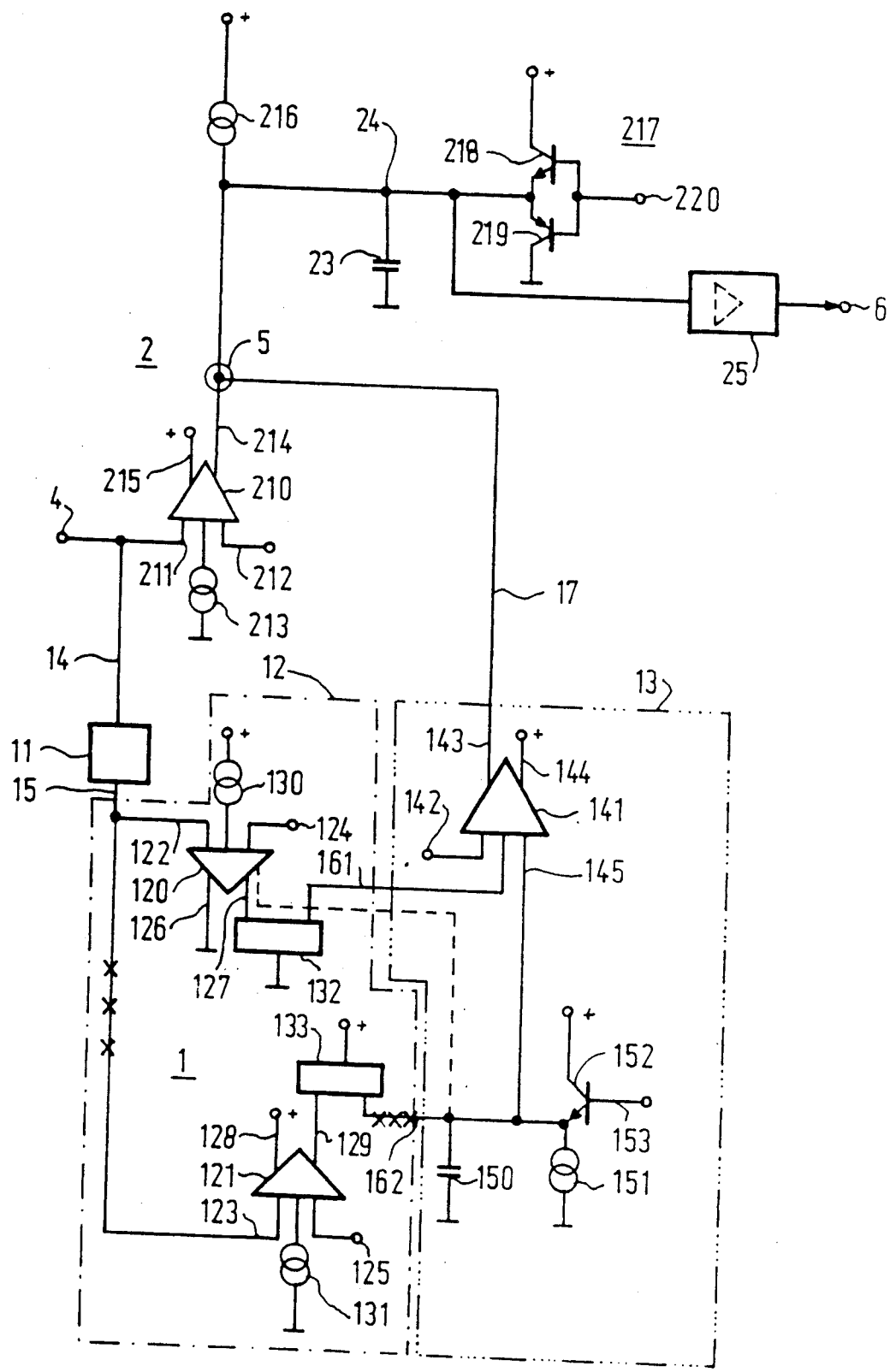

FIG. 3 shows in some greater detail a modification of the first and the second signal branches 1 and 2, respectively, of the arrangement shown in FIG. 1. Elements corresponding to those shown in FIG. 1 are denoted by the same reference numerals.

In the arrangement of FIG. 3, the television signal is applied from the television signal input 4 via the low-pass filter 11 and the conductor 15 within the synchronizing pulse detector 12 is always connected to a signal input 122 or 123, respectively, of first and second differential amplifiers 120 and 121. The differential amplifiers constitute signal level detectors and in known manner always comprise an emitter-coupled pair of transistors of which always one transitor constitutes by means of its base terminal one of the signal inputs 122 or 123. The other base terminal, which serves as a reference signal input 124 or 125, respectively, receives a constant voltage. The collector terminals of the emitter-coupled transistors are each connected to an output 126, 127 and 128, 129, respectively, of the respective differential amplifiers 120 and 121. A constant supply current is applied to the coupled emitter terminals via a current source 130 and 131, respectively.

In a corresponding manner, the cut-off level for the detection of the synchronizing pulses is applied to the reference signal inputs 124 and 125. In response thereto the current produced by the current sources 130 and 131, respectively, flows in the second outputs 127 and 129, respectively, when a synchronizing pulse occurs. In the other time intervals, the current from the current source 130 and 131, respectively, is conveyed to one of the terminals of the energy source (ground or plus) via the first output 126.

The current in the second outputs 127 and 129, respectively, is mirror-inverted in known manner via current mirror arrangements 132 and 133, respectively, and appear at respective outputs 161 and 162 of the synchronizing pulse detector 12.

In the circuit arrangement of FIG. 3, the synchronizing pulse detector 12 is followed by the pulse generating stage 13 which includes a third differential amplifier 141 which is of a similar structure as the first and second differential amplifiers, 120, 121. More specifically, its reference signal input 142 receives the cut-off level, which is also applied to the reference signal inputs 124, 125. An output 143 is connected to the conductor 17, a second output 144 is connected to the positive terminal of the energy source. The coupled emitter terminals of the third differential amplifier 141 receive via the first output 161 the current from the current mirror arrangement 132 in the synchronizing pulse detector 12. In the pulse generating stage 13 the second output 162 of the synchronizing pulse detector 12 is connected to a capacitor 150 which has its second terminal connected to ground. In addition, the connection between the output 162 and the capacitor 150 is connected to a signal input 145 of the third differential amplifier 141.

Before the occurrence of a synchronizing pulse in the first synchronizing signal Sy1 no current flows across the first or the second output 161 and 162, respectively, of the synchronizing pulse detector 12. Consequently, the capacitor 150 remains in a charging state to which a given voltage level is assigned by a discharging current source 151 and a blocking transistor 152. To that end the main current path of the blocking transistor 152 is arranged in series with the discharge current source 151 and this series arrangement is connected between the terminals of the energy source. The base terminal 153 of the blocking transistor 152 is connected to a constant reference voltage; the junction point between the blocking transistor 152 and the discharging current source 151 is connected to the capacitor 150. If the voltage across the capacitor 150 decreases in response to the current from the discharging current source 151 to below the value determined by the reference voltage at the base terminal 153 and the base-emitter forward voltage of the blocking transistor 152, the current from the discharge current source 151 is absorbed by the blocking transistor 152 and does no longer charge the capacitor 150. The blocking transistor 152 therefore acts as a diode connected between the capacitor 150 and the reference voltage applied to the base terminal 153 with the advantage that the reference voltage is not loaded by the discharge current.

At the occurrence of the synchronizing pulse a current which preferably is only slightly higher than the discharge current and charges the capacitor 150 to higher voltages and exceeds the discharge current from the discharge current source 151 by a predetermined amount, flows across the second output 162 of the synchronizing pulse detector 12. If the voltage across the capacitor 150, which is applied to the third differential amplifier via signal input 145, exceeds the cut-off level at the reference signal input 142 the current from the first output 161 of the synchronizing pulse detector 12 is switched to the first output 143 of the third differential amplifier 141 and consequently to the conductor 17 to the second output 144 and therefore is picked up from the energy source. The conductor 17 is then currentless. Thus, all together, during the first part of each synchronzing pulse a current pulse occurs on the conductor 17 whose variation corresponds to the variation of the pulse illustrated in FIG. 2(d).

In the arrangement shown in FIG. 3, the second signal branch 2 is constituted by a fourth differential amplifier 210, which is of a similar structure as the differential amplifier described in the foregoing and whose signal input 211 is connected to the television signal input 4. Applied to its reference signal input 212 is the threshold value SW for detecting the halfways, which exceed the pulse cycles of the synchronizing pulse, of the second synchronizing signal Sy2. Similarly, a current which is applied to the coupled emitter terminals of the fourth differential amplifier 210 from a current source 213 flows via a first output 214 at the occurrence of the halfwaves, which exceed the threshold value, of the second synchronizing signal Sy2, whereas in the further time intervals the current is discharged via a second output 215 to the positive pole of the energy source. Thus, the fourth differential amplifier 210 constitutes the halfwave detector 221.

In contradistinction to the arrangement shown in FIG. 1, the current from the first output 214 of the fourth differential amplifier 210, that is to say the halfwave detector 21, is not directly and exclusively applied to the signal store 23 in the present circuit, but is is first combined by means of an OR-combining action with the current on the conductor 17 in the first signal branch. The OR-gate 5 is implemented in a very simple manner as what is commonly denoted a "wired OR", that is to say by a simple line junction. The combination of the currents from the first output 214 and the conductor 17 then act on the capacitor 23, which operates as a signal store, so that also during the period of the pulse from the conductor 17 the signal store 23 is charged in the first direction, i.e. it is discharged to lower voltages at the junction point 24. To that end, the two currents are rated in the same or magnitude.

In addition, a permanent charging source 216 which is connected to the positive terminal of the energy source and continuously provides the capacitor 23 with a constant permanent charging current is connected to the junction point 24. The ratio between the current at the first output 214 of the fourth differential amplifier 210, the permanent charging current from the permanent charging source 216 and the value of the capacitor 23 is decisive for the position and duration of the pulses in the processed synchronizing signal, so that the dimensioning of this parameter must be accurately effected. This can be effected in a simple manner by adjusting the ratios between the two currents relative to each other and by adjusting the absolute value of the currents in proportion to the capacitance and can also be obtained without difficulties with the arrangement is constructed as an integrated circuit on a semiconductor crystal. The voltage at the junction point 24 is applied to the output 6 via a pulse shaping stage 25 which converts the continuous voltage transitions at the capacitor 23 into steeper pulse edges.

The junction point 24 is furthermore connected to a voltage limiter circuit 217. This limiter circuit is comprised of the series arrangement of two blocking transistors 218, 219, arranged between the terminals of the energy source.

The interconnected base terminals of the blocking transistors 218, 219 are connected to a reference voltage 220; so that the voltage applied to the junction point between the emitter terminals of the blocking transistors 218, 219 can only vary at the capacitor 23 in a voltage range corresponding to two base-emitter forward voltages of the respective blocking transistors 218, 219. Charging the signal store 23 is consequently always effected from defined voltage levels. For the sake of completeness, it should be noted that charging in FIG. 3 compared with that shown in FIG. 2(e) is effected with just the inverted polarity.

The circuit arrangement according to the invention, more specifically also in accordance with the embodiment of FIG. 3, is very suitable for full integration on a semiconductor crystal, as the capacitance values for the signal store 23 and the capacitor 150 can be kept very low. In addition, the integration provides the possibility of a narrow correlation between the currents from the individual current sources and the tolerances of the further components so that all together a very accurate mode of operation of the circuit is obtained.

The circuit arrangements described are suitable, without external control, both for processing a television signal with a second synchronizing signal Sy2 or also without it. When the second synchronizing signal Sy2 does not occur, the synchronizing pulses having consequently a constant pulse cycle, the halfwave detector 21 or the fourth differential amplifier 210, respectively, is continuously inoperative and does not affect the charge reversal of the capacitor 23. As a result thereof, the change-over switch 7 is switched back from the terminal 9 to the television signal input 4 after the pulse from the pulse generating stage 13 on the conductor 17 has ended. Since however constant levels are present on both terminals during the synchronizing pulse, a processed synchronizing signal having the same property is produced at the television signal output 8, which consequently can be further processed in a customary manner. Accordingly, numerous over variations and modifications will become apparent to those skilled in the art which will still be within the scope of the invention as defined in the appended claims.

We claim:

1. An arrangement for processing, in a television signal, a first, low-frequency synchronizing signal on which a second, high-frequency synchronizing signal is superposed, the arrangement comprising: a first signal processing branch comprising a low-pass filter for separating low-frequency components and consequently the first synchronizing signal from the television signal, a synchronizing pulse detector for detecting signal variations exceeding a cut-off level in the low-frequency components, and pulse generating means for producing a pulse when such a signal variation corresponding to the first synchronizing pulse is detected, the pulse being of a duration shorter than the shortest second synchronizing signal, a second signal processing branch having a halfwave detector for separating signal peaks exceeding maxima of the first synchronizing, from the television signal and for charging a signal store in a first direction during a time interval corresponding to the periods of the second synchronizing signal, in which the signal peaks occur, and a third signal processing branch during a time interval in which either a pulse is supplied in the first signal processing stage or the signal store is charged in the first direction, a signal having a constant reference level is transmitted and the television signal is transmitted in a remaining period of time.

2. A circuit arrangement as claimed in claim 1, characterized in that the signal store is also charged in the first direction during the period of the pulse supplied by the pulse generating stage.

3. A circuit arrangement as claimed in claim 1 or 2, characterized by a continuous charging source for continuously charging the signal store in a second direction opposite to the first direction.

4. A circuit arrangement as claimed in claim 1 or 2, comprising an integrated semiconductor circuit.

5. A circuit arrangement according to claim 3 comprising an integrated semiconductor circuit.

* * * * *